(12) United States Patent  (10) Patent No.: US 9,137,112 B2
Grillo et al.  (45) Date of Patent: Sep. 15, 2015

(54) BONDING LINE MISMATCH DISCOVERY METHOD AND NODE ARRANGEMENTS

(75) Inventors: Davide Grillo, Savona (IT); Gianluca Colla, Genoa (IT); Lorenzo Marchionini, Genoa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1093 days.

(21) Appl. No.: 12/984,724

(22) Filed: Jan. 5, 2011

(65) Prior Publication Data

US 2012/0169494 A1   Jul. 5, 2012

(30) Foreign Application Priority Data

Dec. 30, 2010   (WO) ................. PCT/SE2010/051499

(51) Int. Cl.
*G08B 21/00*   (2006.01)
*H04L 12/24*   (2006.01)

(52) U.S. Cl.
CPC ......... *H04L 41/0866* (2013.01); *H04L 41/0213* (2013.01); *H04L 41/06* (2013.01)

(58) Field of Classification Search
USPC .......................................... 340/540; 370/431
See application file for complete search history.

(56) References Cited

U.S. PATENT DOCUMENTS

| 4,195,206 | A * | 3/1980 | Baichtal | 370/248 |
| 6,724,880 | B1 * | 4/2004 | Lynch | 379/219 |
| 7,693,090 | B1 * | 4/2010 | Kimpe | 370/254 |
| 7,734,175 | B2 * | 6/2010 | Amemiya et al. | 398/45 |
| 8,040,807 | B2 * | 10/2011 | Pai et al. | 370/236 |
| 8,045,551 | B2 * | 10/2011 | Madrahalli et al. | 370/389 |
| 2006/0126505 | A1 * | 6/2006 | Denney et al. | 370/229 |
| 2007/0047733 | A1 * | 3/2007 | Bremer et al. | 379/416 |
| 2007/0274239 | A1 * | 11/2007 | Nguyen et al. | 370/282 |
| 2008/0253295 | A1 * | 10/2008 | Yumoto et al. | 370/245 |
| 2008/0288190 | A1 * | 11/2008 | Wang et al. | 702/59 |
| 2010/0027557 | A1 | 2/2010 | McGarry et al. | |
| 2010/0118886 | A1 | 5/2010 | Saavedra | |
| 2010/0195489 | A1 | 8/2010 | Zhou et al. | |
| 2011/0051734 | A1 * | 3/2011 | Cardona et al. | 370/400 |

FOREIGN PATENT DOCUMENTS

WO   2008007353 A2   1/2008

OTHER PUBLICATIONS

PCT International Search Report, mailed Oct. 5, 2011, in connection with International Application No. PCT/SE2010/051499.
PCT Written Opinion, mailed Oct. 5, 2011, in connection with International Application No. PCT/SE2010/051499.

* cited by examiner

*Primary Examiner* — Naomi Small
(74) *Attorney, Agent, or Firm* — Leffler Intellectual Property Law, PLLC

(57) ABSTRACT

The present invention relates to methods for indicating a bonding configuration mismatch of lines of bonding groups. The methods are performed in different nodes of a communications network. Said method comprises sending a Bonding Configuration Value via one line of the bonding group of lines, said Bonding Configuration Value being unique for said bonding group, and receiving a Bonding Configuration Value via each of the lines of the bonding group. It further comprises checking each received Bonding Configuration Value for diverging values. If a diverging Bonding Configuration Value is identified, an alarm message is generated and sent to Element Manager of the communications network.

7 Claims, 9 Drawing Sheets

BONDING LINE MISMATCH DISCOVERY METHOD AND NODE ARRANGEMENTS

CROSS-REFERENCE TO RELATED APPLICATIONS

This application claims priority under 35 U.S.C. §119 to PCT Patent Application No. PCT/SE2010/051499, filed Dec. 30, 2010, which is hereby incorporated herein by reference in its entirety.

TECHNICAL FIELD

The following disclosure relates to a method for indicating a mismatch configuration of lines of bonding groups in a node of a communications network, a method in a node connected to lines of a bonding group in a communication network, and nodes configured for performing said methods.

BACKGROUND

The following methods, apparatuses, networks and systems relate to bonding techniques wherein data traffic is spread over multiple xDSL links. Digital Subscriber Line, xDSL, is a family of technologies that provides digital data transmission over the wires, e.g. copper wires, of a local communications network, such as a local telephone network. Bonded xDSL lines are considered as a single virtual link. Such a link has a bandwidth equal to the sum of bandwidths of all separate links. These techniques apply to service and net providers needing large amount of bandwidth between two network sides. Moreover, the techniques assure security regarding transmission faults over one or more bonded xDSL lines. The technology let the providers offer services to customers placed far from a Central Office, i.e. the Service Provider System Node.

A number of xDSL lines are bonded i.e. aggregated, to form a bonding group also known as a single bi-directional logical link. Different bonding schemes are defined and standardized, e.g. Asymmetric Transfer Mode (ATM) Based Multi-Pair Bonding specified in ITU-T G.998.1 (January 2005), Ethernet-Based Multi-Pair Bonding specified in ITU-T G.998.2 (January 2005), Multi-Pair Bonding using Time-Division Inverse Multiplexing (TDIM) and Packet Transfer Mode (PTM) Based Multi-Pair Bonding specified in ITU-T G.998.2, which is based on PTM technique introduced in IEEE 802.3ah (2004). PTM bonding defines a method to aggregate multiple xDSL lines into a single logic link capable of transferring an Ethernet flow with a bandwidth bigger than the single copper network itself is capable of.

PTM bonding is used if optical fibre technology can't be used. The PTM standard introduces a new protocol level, i.e. the Physical Coding Sublayer (PCS), underneath Ethernet Media Independent Interface (MII), in charge of converting Ethernet traffic to xDSL traffic. Inside this new level there are two functionalities:
  MAC-PHY Rate Matching which adapts transmitted data rate to the physical data rate (usually lower);
  Physical Aggregation Function (PAF) which makes Ethernet packets multiplexing over all the physical links belonging to the bonding group. PAF has the following characteristic:
    1. It allows aggregation of up to 32 physical links;
    2. It supports different rate links;
    3. It assures low packet latency and the order in the frame.
  The packets coming from MAC level (layer 2) are divided in the PAF into fragments with length from 64 up to 512 byte. Any fragmentation algorithm has not been standardized but it is up to the vendors to implement it depending on the bonding type.

Every fragment has a header indicating the position inside the packet itself and ends with a 4 bytes Frame Check Sequence (FCS) to let a reassembler at the receiver side verify the integrity. Further, the PAF level at the receiver side picks up the fragments and pools them together to set the packet up. To achieve that, one fragment is kept in a buffer waiting for the right timing to reassemble the packet.

Compared to all the other known bonding techniques, PTM bonding is better over all aspects dealing with Ethernet traffic transmission. It has been made to be compliant with all copper line transmitting, with the possibilities to have different lines in the bonding group. Moreover, it is more protected against noise and allows dynamic line add/drop.

Thus, the above described bonding techniques may be used for providing digital data transmission, i.e. data traffic, over the wires, e.g. copper wires, of a local communications network, such as a local telephone network. A communications network may comprise Central Office, CO, nodes connected to Customer Premises Equipment, CPE, nodes via physical communications links. The network and said nodes are controlled from an element manager node. Like previously stated, bonding provides line aggregation into a single entity. The physical communication links correspond to said single communication entities. Actually, in the xDSL case, the xDSL lines connecting a CO to a CPE get the show time state after the handshaking procedure is completed, even though
  1. CPE mismatch: The connected CPE does not support bonding at all; or
  2. Cabling mismatch: The CPE supports bonding but, because of potential cabling mismatch, one or more lines are actually not connected to the correct CPE, e.g. to another CPE.

Due to any of said two bonding configuration mismatch problems, the data traffic does not flow all the way through, even though everything is looking fine in the network and system from a physical layer point of view. Basically the handshaking procedure G.Hs standard, G.Hs standard ITU-T G.994, lets the line normally come up, because there is no check over the bonding status.

SUMMARY

One object is therefore to provide networks comprising bonding groups of lines with methods and nodes indicating bonding configuration problems.

Particular embodiments provide a method for indicating a bonding configuration mismatch of lines of bonding groups in a node of a communications network. Said embodiments comprise sending a Bonding Configuration Value via one line of the bonding group of lines, said Bonding Configuration Value being unique for said bonding group, and receiving a Bonding Configuration Value via each of the lines of the bonding group. It further comprises checking each received Bonding Configuration Value for diverging values.

In some embodiments of the method, an alarm message is generated if at least one of the received values is diverging from the other received values.

According to certain aspects, a Bonding Configuration Value is a bonding identity used for identification of lines and components in a network. A Bonding Configuration Value is an identity configuration represented in any numerical, alphabetic or alphanumerical form, digitally or other.

Further particular embodiments provide a method in a node, preferably a Customer Premises Equipments node, connected to lines of a bonding group in a communication network. Said embodiments comprise receiving a Bonding Configuration Value via one line of the bonding group of lines connected to the node, and storing the received Bonding Configuration Value. It further comprises sending the stored Bonding Configuration Value via each line of the bonding group connected to the node as a response to received handshaking messages on the lines.

Additional aspects are also to provide a node, preferably a Central Office node, comprising an entity for indicating a mismatch configuration of bonded lines in a communications network. The entity comprises a sender module configured to send a Bonding Configuration Value via one line of the bonding groups of lines, said Bonding Configuration Value being unique for said bonding group, and a receiver configured to receive a Bonding Configuration Value via each of the lines of the bonding group. The node further comprises a detector configured to check each received Bonding Configuration for diverging values.

In some embodiments of the node, the detector is configured to generate an alarm message if at least one of the received values is diverging from the other received values and/or from the configured value too.

Further embodiments provide a node, preferably a Customer Premises Equipments node, comprising an entity, wherein said entity is connected to lines of bonding groups in a communication network. The entity comprises a receiver configured to receive a Bonding Configuration Value via one line of the bonding group of lines connected to the node, and a sender configured to send the Bonding Configuration Value via each line of the bonding group connected to the node as a response to received handshaking messages on the lines.

Further one object is to provide element managers in the communications network handling alarms/events regarding bonding configuration problems, i.e. both CPE and cabling mismatch.

This object is achieved by embodiments of a method in a node, preferably a node comprising an Element Manager. Said node is connected to one or more nodes comprising Central Office functionality in a communications network. Said method is configured to receive, e.g. from said central office nodes, an alarm message comprising information concerning bonding configuration mismatch of bonded lines in the communications network.

Further, a node, preferably a node comprising an Element Manager, is provided, which is configured to receive an alarm message comprising information about the bonding configuration mismatch.

Further embodiments are provided by the dependent claims.

One advantage of the above described embodiments is that the embodiments allow automatic detection of a mismatch problem and relevant notification via e.g. alarms; problem diagnose is immediate and identification of misconfigured lines is possible and again immediate.

Another advantage is that the embodiments provide easy implementation in existing communication networks.

Further one advantage is that the embodiments provide a cost-effective solution to the problem of miss-matched cabling and nodes.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced and other embodiments that depart from these specific details. In other instances, detailed descriptions of well known methods, devices, and circuits are omitted so as not to obscure the description of the present invention with unnecessary detail.

Figure 1:
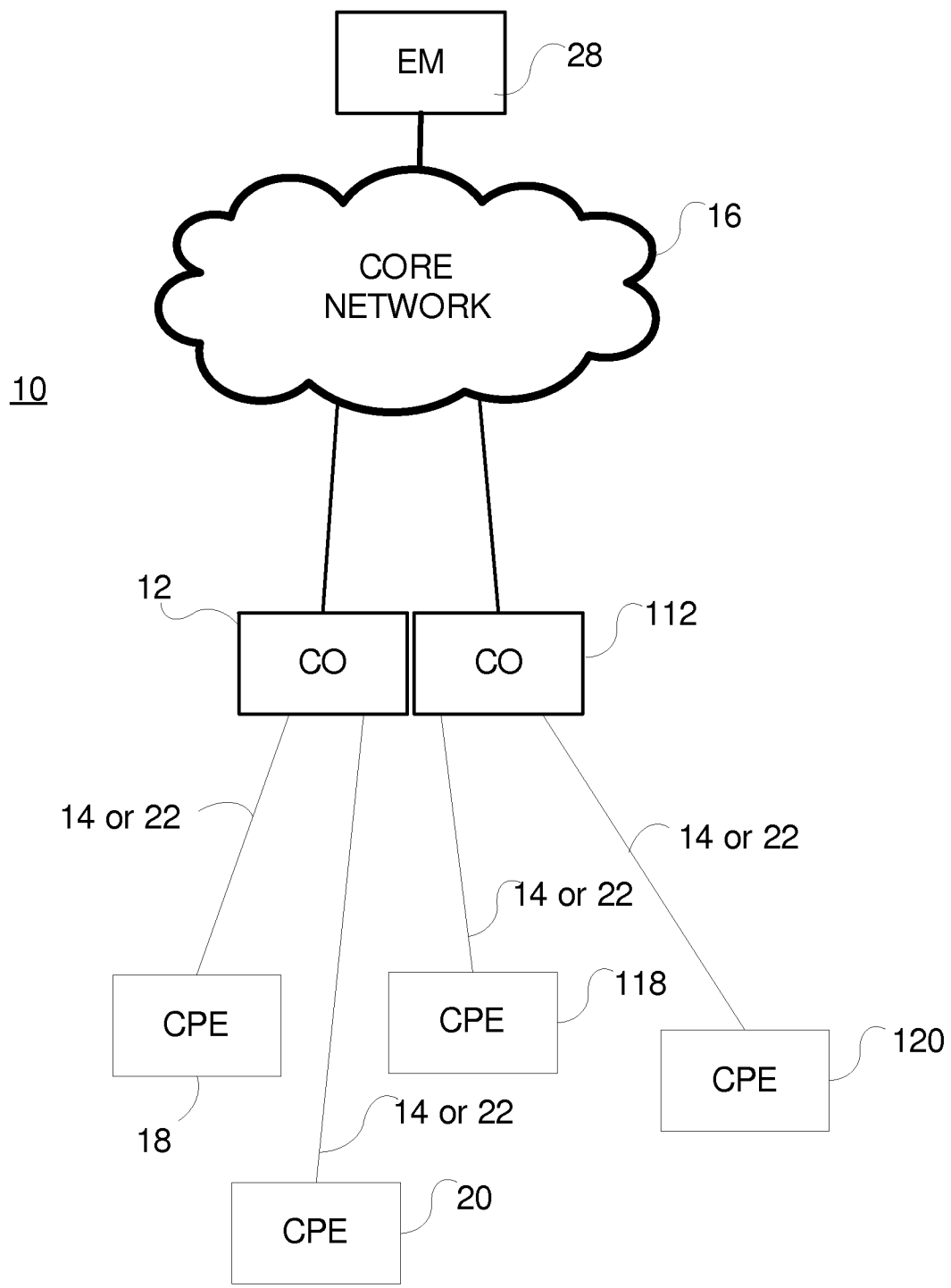
FIG. 1 is a block diagram of an exemplary network in which systems and methods described herein is implemented.

FIG. 1 is a block diagram of an exemplary network in which entities and methods described herein may be implemented. The network 10 in FIG. 1 comprises a number of nodes connected via physical communications lines 22 and/or bonding groups (of communications lines 22) 14, so called logical communications links. Two of the nodes are Service Provider System nodes 12, 112, which are connected to a number of nodes, in this example four End-Service Consumer System nodes 18, 20, 118, 120. Said nodes are controlled by the Element manager node 28. Said node 28 may be directly connected to, or via a core network 16 associated to, the Service Provider System nodes 12, 112.

A Service Provider System node 12,112 is also known as Central Office (CO) side and the End-Service Consumer System nodes 18, 20, 118, 120 are also known as Remote Terminal (RT) sides or Customer Premises Equipments (CPEs). As understood, a Service Provider Node is a node belonging to and controlled by the Service Provider in the Network. An End-Service Consumer System node is a node located at a consumer's premises. A consumer may also be denoted customer, user, end-user, subscriber, etc. Remote Terminals or Customer Premises Equipments may be any kind electronic communications device, e.g. telephones, facsimiles, computers, PC:s, television apparatuses, modems, etc.

Figure 2:
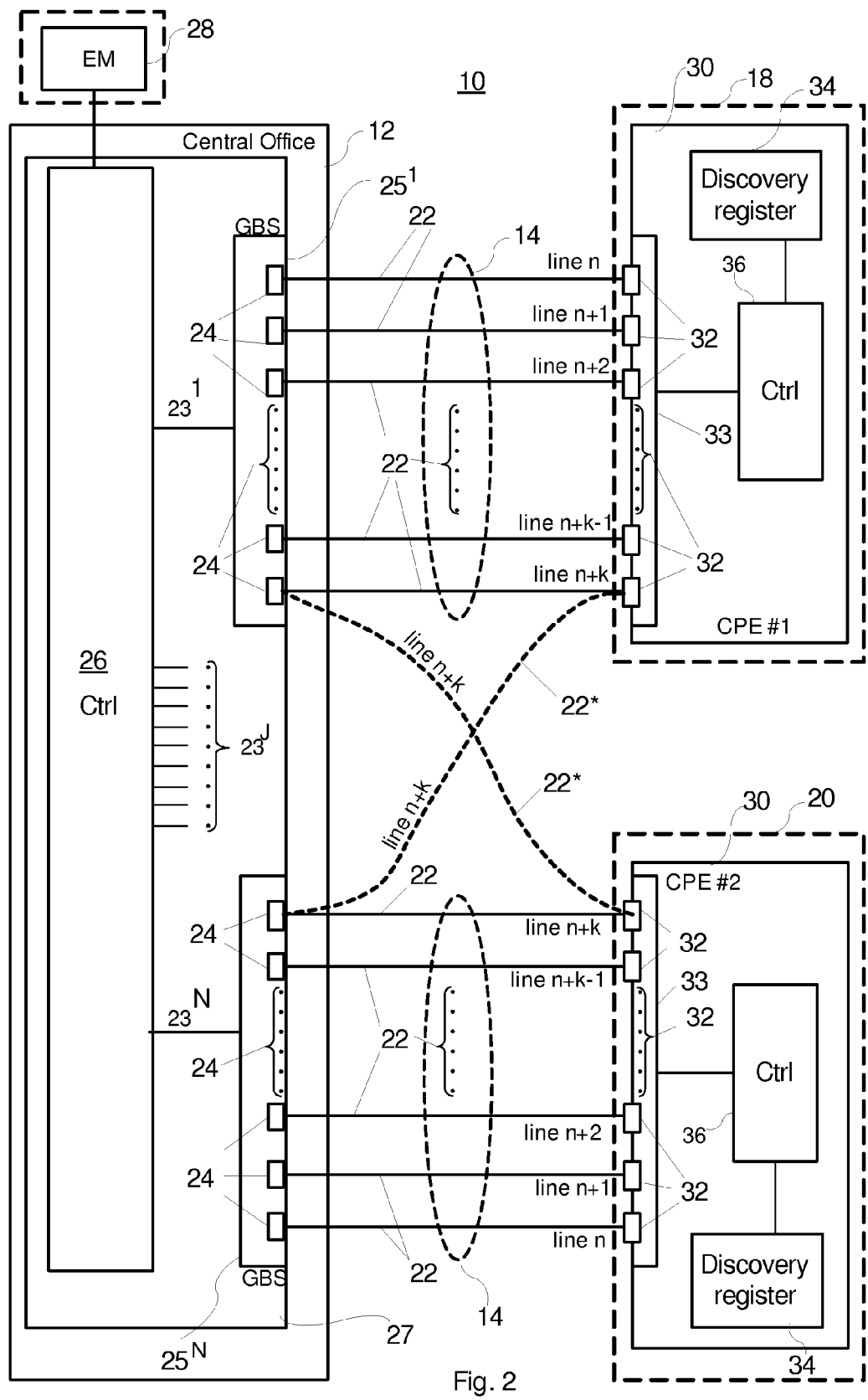
FIG. 2 is a block diagram schematically illustrating a network comprising a Service Provider System node and two End-Service Consumer System nodes.

One of the Service Provider System nodes, node 12, and the two End-Service Consumer System nodes 18, 20 are configured according to prior art and said nodes are presented in more detail in FIG. 2. The second Service Provider System node, node 112, and the two End-Service Consumer System nodes 118, 120 are basically configured as the corresponding nodes 12, 18, 20 in FIG. 2, but said nodes 112,118, 120 are also configured to operate according to embodiments of the present invention. The second Service Provider System node, node 112, and the two End-Service Consumer System nodes 118, 120 are therefore described both in FIG. 2 and FIG. 3.

FIG. 2 is schematically illustrating a part of the network 10, e.g. a local communications network, illustrated in FIG. 1 comprising a Service Provider System node 12, two End-Service Consumer System nodes 18, 20 and an Element Manager 28 in a node of the network.

The Service Provider System node 12, hereafter denoted Central Office Node, CO, comprises a communications device 27, e.g. a Digital Subscriber Line Access Multiplexer, DSLAM, and a Controller 26 for controlling the functionality of the device 27.

The CO node 12 comprises a number of ports 24. Each port 24 is connected to a communication line 22.

Generally, a CO node is connected via communication lines to a number of End-Service Consumer System nodes located e.g. at the premises of consumers, users, subscribers, etc. In the example illustrated in FIG. 2, the CO node 12 is connected to two End-Service Consumer System nodes 18, 20 via the communication lines 22. Said End-Service Consumer System nodes comprise Remote Terminals, RT, 30 or Customer Premises Equipments, CPEs, 30. In this description, Remote Terminals are considered to be equivalent with Customer Premises Equipments CPE. Said equipment is therefore denoted CPE in the following description and in the enclosed drawings.

Generally, a CPE comprises one or more ports for connection to the communication lines. In the example illustrated in FIG. 2, the CPEs 30 comprise a plurality of ports 32. In the illustrated example, the number of lines 22 is k connecting k ports 24 of the DSLAM 27 with k ports of the CPE 30 in the End-Service Consumer System nodes 18, 20. The CPE devices 30 of different nodes may involve different number of ports, and thus, the number k of ports 32 and communication lines 22 may therefore vary from node to node. The number of ports of the CPE 30 in node 18, said CPE marked "CPE#1" in FIG. 2, may be different from the number of ports of the CPE 30 in node 20 said CPE/RT marked "CPE#2" in FIG. 2.

End-Service Consumer System nodes are connected to the Service Provider System Node via the logical communication links 14, which comprise single bi-directional physical links 22. Said communication links comprises a number of xDSL lines 22, e.g. copper lines. In FIG. 2, said lines are numbered from n, n+1, n+2, . . . , n+k−1, n+k, i.e. n+i, n and i being integer numbers, wherein n≥1 and selected among any number, and i starting from 0 (zero) and counted up to k, which is the number of ports of the CPE which the lines are connected to. Thus, each line 22 and link 14 preferably has a unique identifier for identification purposes in the communications network. A port 24 of the DSLAM and corresponding port 32 of the CPE may get the same number as the line to which they are connected. Said number of xDSL lines 22 are bonded, alternatively called aggregated, to form a bonding group 14 of lines also known as a single bi-directional logical link 14. Different bonding schemes are defined and standardized, e.g. ATM-Based Multi-Pair Bonding specified in ITU-T G.998.1 (January 2005), Ethernet-Based Multi-Pair Bonding specified in ITU-T G.998.2 (January 2005), Multi-Pair Bonding using Time-Division Inverse Multiplexing (TDIM) and Packet Transfer Mode (PTM) Based Multi-Pair Bonding specified in ITU-T G.998.2, which is based on PTM technique introduced in IEEE 802.3ah (2004). All schemes allow bonding of up to 32 individual sub-layers, e.g. lines or bearer channels, with variable rates, providing common functionality for the configuration, initialization, operation and monitoring of the bonding group or bonded link. Further, a bonded interface between two nodes is referred to as a Generic Bonded Sublayer, GBS.

The G.998.x Bonding allows a number of lines to be aggregated onto a single logical GBS port $25^m$, m being an integer number in the interval [1,N], wherein N is the number of bonding groups. by splitting the incoming data traffic into multiple data streams, distributing the data streams to the lines, e.g. one data stream to one specific line 22, and transmitting each stream over the specific line 22 and combining the data streams at the remote GBS port 33, preserving the original traffic order.

In the example illustrated in FIG. 2, together, some of the ports 24 of the DSLAM 27 configure a Generic Bonded Sublayer, GBS, port $25^1$, and other ports 24 configure together the GBS port $25^N$.

Even though it is not illustrated in FIG. 2, the DSLAM 27 may comprise more GBS ports than the two illustrated GBS ports $25^1$, $25^N$ to which the bonded xDSL lines 22 of the bonding group, i.e. the logical communication link 14, are connected. The device 27 is also provided with at least one Controller 26, ctrl, for controlling the ports 24 and the GBS ports $25^m$. Each port and GBS port is controlled by the Ctrl 26 via control lines $23^1$, . . . , $23^J$, . . . , $23^N$. As illustrated, GBS port $25^1$ is controlled via control line $23^1$, GBS port $25^N$ is controlled via control line $23^N$, and a number of control lines $23^J$ for controlling other ports 24 and GBS ports $25^m$, which are not illustrated.

Note that, even though a single control line is illustrated in the figures, it might comprise one or more control lines $23^J$. Each port 24 is connected to a receiver circuit, transmitter circuit, or transceiver circuit (not shown). One receiver circuit, transmitter circuit, or transceiver circuit may comprise one or more ports 24. One GBS port $25^m$ may therefore comprise one or more receiver circuit, transmitter circuit, or transceiver circuit. As each control line is connected to a receiver circuit, transmitter circuit, or transceiver circuit of a GBS port comprising one or more receiver circuit, transmitter circuit, or transceiver circuit, a GBS port may be connected to more than one control line.

Big Ethernet frames may be fragmented before the transmission over a bonding group, i.e. a Generic Bonded Sublayer, and reassembled at the remote end to minimize transportation delay.

The logical communication links 14 of bonded xDSL lines 22 carries the bi-directional data stream traffic, i.e. data stream communication, between the Service Provider System node 12, i.e. Central Office node side, and the End-Service Consumer System nodes 18, 20. Said nodes comprise Remote Terminals (RT) 30 or Customer Premises Equipments (CPEs) 30. Each CPE or RT 30 comprises a GBS port 33 provided with ports 32 to which the bonded xDSL lines 22 of the bonding group, i.e. the logical communication link 14, are connected. Each CPE or RT 30 is provided with a controller, Ctrl, unit 36 comprising a programmable processor, or processing circuits, with storages for computer software. The controller or controller unit 36 is configured to control the functionality, operation and performance of the CPE 30 and of blocks, modules, circuitry, components, etc connected to CPE 30 in the End-Service Consumer System nodes 18, 20.

As an example, the CPE is provided with a discovery register 34, which is connected to the Ctrl 36. By means of the discovery register, the GBS ports 30 may optionally support discovery operation. The discovery register comprises important data information e.g. data information about the node, information about the bonded xDSL lines 22 of the bonding group, i.e. the logical communication link 14, and the CPE where it is located. Said data is retrievable by the Ctrl unit during different operations, e.g. initialization via handshake protocol.

The element manager 28 has the controlling functionality of the CO node and the functionality blocks, e.g. communication devices 27 which may be a Digital Subscriber Line Access Multiplexer (DSLAM).

The controller 36 and the element manager 28 are preferably implemented in digital electronically circuitry, or in computer hardware, firmware, software, or in combinations of them. Apparatus of the invention may be implemented in a computer program product tangibly embodied in a machine readable storage device for execution by a programmable processor; and method steps of the invention may be performed by a programmable processor executing a program of instructions to perform functions of the invention by operating on input data and generating output.

The controller 36 and element manager 28 may advantageously be implemented in one or more computer programs that are executable on a programmable system including at least one programmable processor, or processing circuitry, coupled to receive data and instructions from, and to transmit data and instructions to, a data storage system, at least one input device, and at least one output device. Each computer program may be implemented in a high-level procedural or object-oriented programming language or in assembly or machine language if desired; and in any case, the language may be a compiled or interpreted language.

Generally, a processor, or processor circuitry, will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially—designed ASICs (Application Specific Integrated Circuits).

A mismatch configuration problem of lines 22 may sometimes occur. Such a situation is also indicated in FIG. 2, wherein lines 22*, also identified as n+k in the drawing, has been cross-connected, which configuration is illustrated with the hatched lines. Thus, the data streams lead on lines 22* will not arrive to the correct nodes and correct GBS port. Such a situation may result in data loss.

As stated above, a problem is that the reason for the data loss is hard to find and, if there is a mismatch configuration problem of lines 22, as indicated in FIG. 2, it may be another problem to locate the mismatch, as there is no means for generating an alarm or indicate the place for the mismatch of lines.

Figure 3:
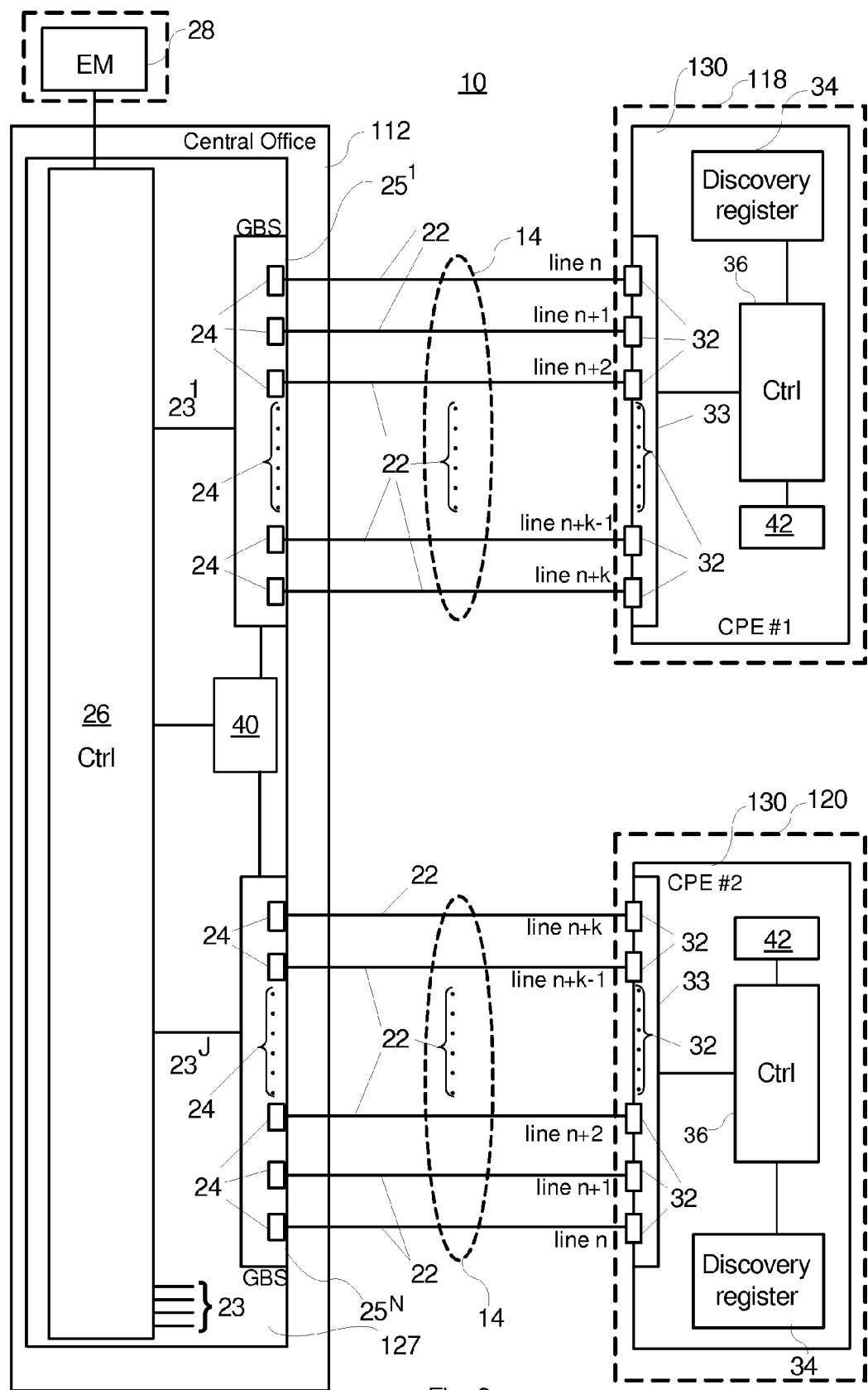
FIG. 3 is illustrating embodiments of a Service Provider System node and two End-Service Consumer System nodes according to some aspects of the present invention.

FIG. 3 is schematically illustrating a part of the network 10, e.g. a local communications network, illustrated in FIG. 1 comprising a Service Provider System node 112, two End-Service Consumer System nodes 118, 120 and an Element Manager 28 in a node of the network. The network 10 and the nodes of the illustrated embodiment in FIG. 3 comprise the same blocks, means, modules, components, etc. as the network 10 and the nodes illustrated in FIG. 2. Thus, the illustrated embodiments of the nodes 112, 118, 120 in FIG. 3 are identical to the corresponding nodes 12, 18, 20 in functionality and components, elements units, blocks, etc as described above regarding the embodiments of FIG. 2, except that said nodes 112, 118, 120 are provided with means for enabling the detection of CPE mismatch and cabling mismatch and for releasing alarm/event upon detection. Thus, the node 112 comprises a communication device 127, corresponding to the communications device 27 illustrated and described in FIG. 2, which device 127, e.g. a DSLAM, is provided with a functionality module 40 associated with, or a part of, the Ctrl 26 and connected to each GBS:s $25^m$, in this case $25^1$ and $25^N$. Thus, compared to node 12 in FIG. 2, the node 112 is enabled to detect of CPE mismatch and cabling mismatch and for releasing alarm/event upon detection.

The nodes 118 and 120 comprise a CPE 130 corresponding to the CPE 30 illustrated and described in FIG. 2.

The Ctrl unit 36 of the CPE 130 is provided with means 42 for supporting the detection of CPE mismatch and cabling mismatch and for releasing alarm/event upon detection. Thus, compared to nodes 18 and 20 in FIG. 2, the nodes 118 and 120 are enabled to support the detection of CPE mismatch and cabling mismatch and for releasing alarm/event upon detection.

Certain aspects of said means 40, 42 are to perform method embodiments for enabling the detection of CPE mismatch and cabling mismatch and for indicating said mismatching e.g. by releasing alarm/event upon detection.

Further, a Bonding Configuration Value is provided for enabling the detection of CPE mismatch and cabling mismatch, a Bonding Configuration Value is a bonding identity used for identification of lines and components in a network. A Bonding Configuration Value is an identity configuration represented in any numerical, alphabetic or alphanumerical form, digitally or other. Thus, the Bonding Configuration Value may be a number, a string of letters or numbers and letters or other characters, etc.

The method embodiments are described with reference to the flowcharts in FIGS. 4A, 4B and 5. Embodiments for implementing said methods are further described with reference to FIGS. 8 and 9.

Figure 4A:
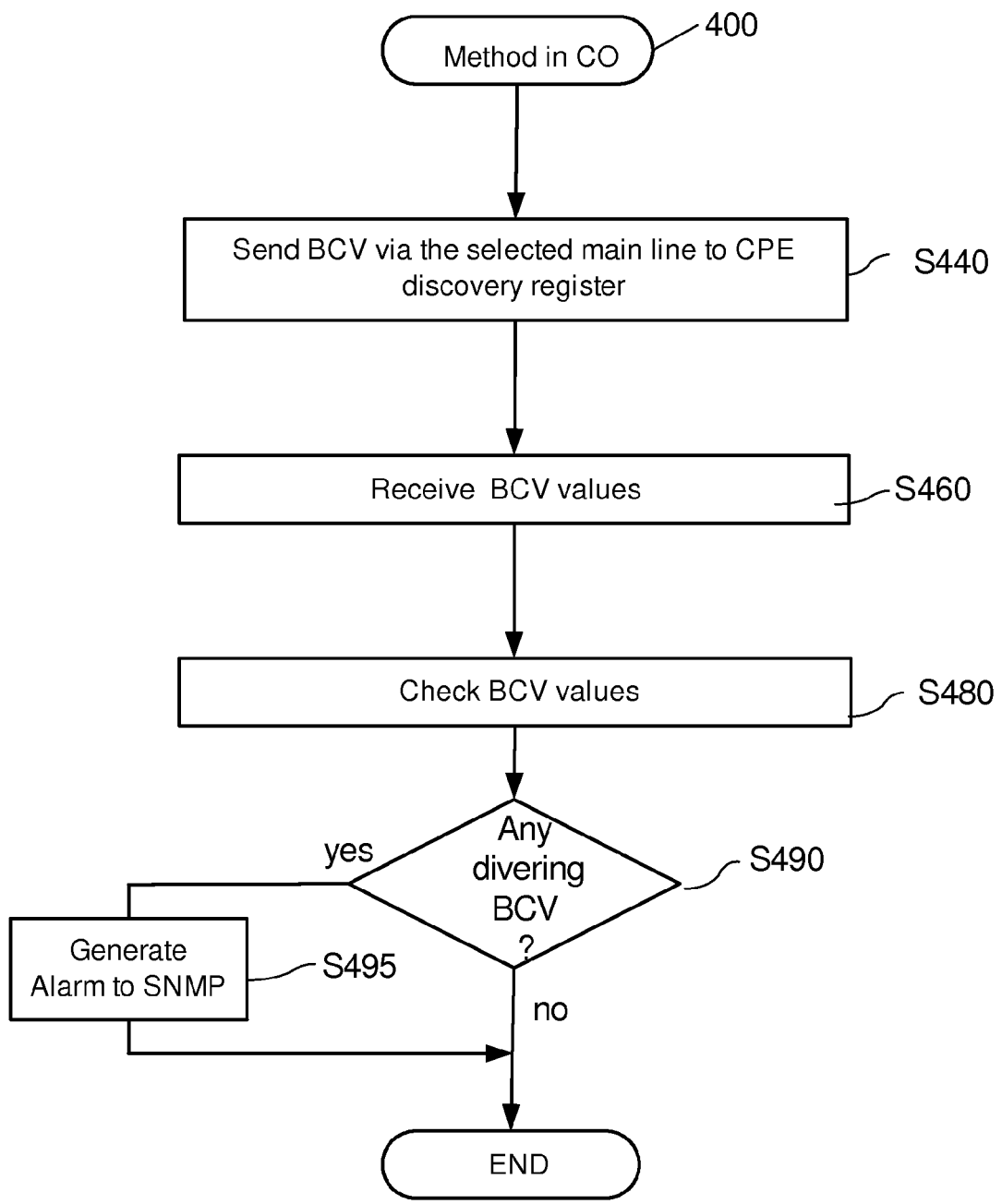
FIG. 4A is a flowchart illustrating some embodiments of a method according to some aspects of the present invention.

FIG. 4A is a flowchart illustrating some embodiments of a method 400 for indicating a mismatch configuration of lines 22 of bonding groups 14 in a Service Provider System node of a communications network 10. The method is performed for each bonding group connected said node. Each bonding group has its own unique Bonding Configuration Value, BCV. Said lines 22 and bonding groups are connecting the Service Provider System node and one or more End-Service Consumer System nodes. The Service Provider System node 112 is provided with a node entity 40, see FIG. 3, which enables the node to perform following subparts of the method for each bonding group of lines:

S440: Sending a Bonding Configuration Value via one line of the bonding group of lines to one of the End-Service Consumer System nodes. The sent Bonding Configuration Value is specific for said bonding group. The Bonding Configuration Value is preferably sent in a message according to a suitable protocol.

S460: Receiving values on each line of the bonding group. The unique Bonding Configuration Value for said bonding group is expected to be received back from the connected End-Service Consumer System node. However, if a mismatch problem is present for the bonding group, Bonding Configuration Values for another bonding group may be received, or no value or any other value is received. In this case, if no value is received via one line, the loss of a value is also considered as a value, as it is an indicating result. A value could therefore be said to be received via each of the lines of the bonding group connecting the Service Provider System node with the End-Service Consumer System node. The Bonding Configuration Value is preferably received in a message according to a suitable protocol.

S480: Checking the received values. Each received value is checked for diverging values, either by comparing the received Bonding Configuration Values with each other, or comparing the received values with the sent and expected Bonding Configuration Value for the bonding group;

S490: If none of the received values is diverging, i.e. all values are identical and equivalent with the sent and expected Bonding Configuration Value for the bonding group, go to "END", else perform S495.

S495: Generate an alarm if at least one of the received values is diverging from the other received values and/or the sent Bonding Configuration Value. The generated alarm message comprises information about the bonding configuration mismatch, e.g. Indication of line, or lines, for which the received value is diverging from the sent Bonding Configuration Value. Said alarm message is sent to the Element Manager node controlling and managing the CO node.

Figure 4B:
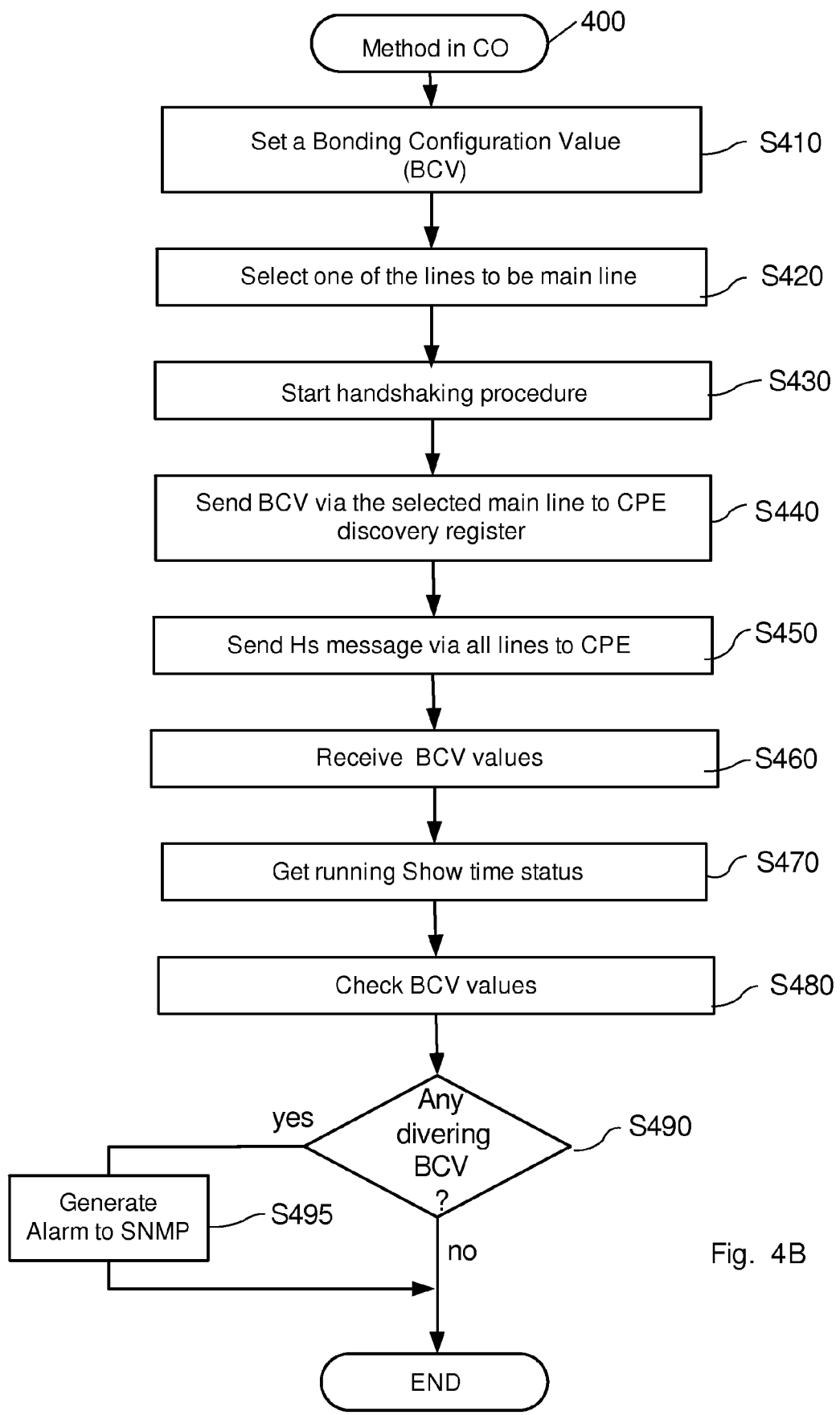
FIG. 4B is a flowchart illustrating further some embodiments of a method according to some aspects of the present invention.

FIG. 4B is a flowchart illustrating further some embodiments of a method 400 for indicating a mismatch configuration of lines 22 of bonding groups 14 in a Service Provider System node of a communications network 10. The method is performed for each bonding group connected said node. Each bonding group has its own unique Bonding Configuration Value, BCV. Said lines 22 and bonding groups are connecting the Service Provider System node and one or more End-Service Consumer System nodes. The Service Provider System node 112 is provided with a node entity 40, see FIG. 3, which enables the node to perform following subparts of the method for each bonding group of lines:

S410: Setting a unique Bonding Configuration Value for each bonding group of lines and End-Service Consumer System node. The value may be set, e.g. by means of an algorithm or manually, to be unique in a local customer Network. The Element Manager must guarantee that the discovery register's BCV is unique for the whole communications network.

S420: Selecting one line of the lines in a bonding group as main line for sending a Bonding Configuration Value and Bonding Configuration Command. The selection of one line, denoted main line, may be performed e.g. by means of an algorithm or as a default selection, e.g. the line with the lowest, or highest number (see FIG. 2 or 3).

S430: Starting handshaking procedure;

S440: Sending a Bonding Configuration Value via one line of the bonding group of lines to one of the End-Service Consumer System nodes. The sent Bonding Configuration Value is specific for said bonding group. The Bonding Configuration Value is preferably sent in a message according to a suitable protocol.

S450: Sending a G.Hs handshaking message through each line of the bonding group;

S460: Receiving values on each line of the bonding group. The unique Bonding Configuration Value for said bonding group is expected to be received back from the connected End-Service Consumer System node. However, if a mismatch problem is present for the bonding group, Bonding Configuration Values for another bonding group may be received, or no value or any other value is received. In this case, if no value is received via one line, the loss of a value is also considered as a value, as it is an indicating result. A value could therefore be said to be received via each of the lines of the bonding group connecting the Service Provider System node with the End-Service Consumer System node. The Bonding Configuration Value is preferably received in a message according to a suitable protocol.

S470: Get running Show time status;

S480: Checking the received values. Each received value is checked for diverging values, either by comparing the received Bonding Configuration Values with each other, or comparing the received values with the sent and expected Bonding Configuration Value for the bonding group;

S490: If none of the received values is diverging, i.e. all values are identical and equivalent with the sent and expected Bonding Configuration Value for the bonding group, go to "END", else perform S495.

S495: Generate an alarm if at least one of the received values is diverging from the other received values and/or the sent Bonding Configuration Value. The generated alarm message comprises information about the bonding configuration mismatch, e.g. Indication of line, or lines, for which the received value is diverging from the sent Bonding Configuration Value. Said alarm message is sent to the Element Manager node controlling and managing the CO node.

Further, alarm message is used for informing an operator, service staff, etc about the bonding configuration problem, i.e. the mismatch. According to some embodiments, a Simple Network Management Protocol (SNMP) alarm trap may be configured as following example:

adslAtucBondinqConfiqurationErrorTrap NOTIFICATION-TYPE OBJECTS {managedObjectClass, managedObjectInstance, sequenceNumber, perceivedSeverity, eventTime, eventTypePem, probableCause, messageId, errorCode}

Status Current

Description

"The current configuration is not allowed. The operator must change the configuration settings.

Further useful information may be included in the alarm message, e.g. identified by means of parameters numbers:

| Parameters | |
| --- | --- |
| 1: Managed object class | (Product ID) |
| 2: Managed object ID | (MAC + PortNo) |
| 3: Sequence number | (Alarm Sequence Number) |
| 4: Perceived Severity | Major |
| 5: Event time | (Timestamp is retrieved from a SNTP server). |
| 6: Event type | Processing ErrorAlarm |
| 7: Probable Cause | ConfigurationOrCustomisationError |
| 8: Message ID | (Internal message number) |
| 9: Err Code | (Additional Error Information)" |

Figure 5:
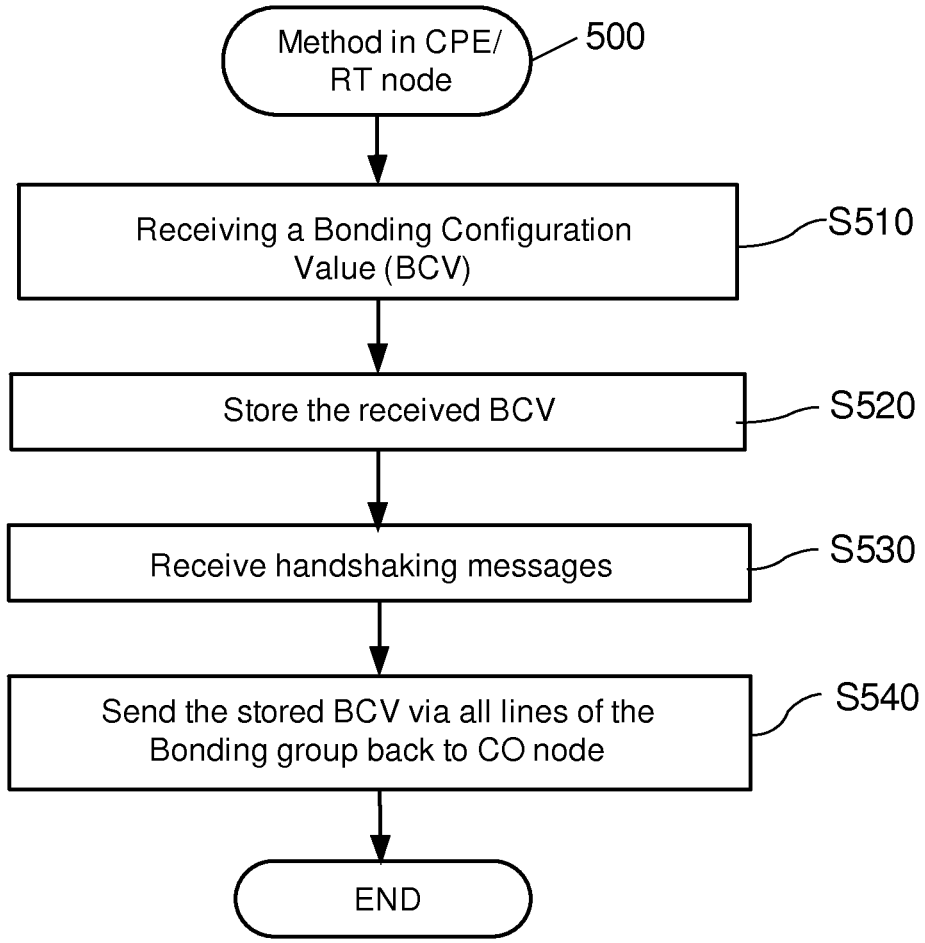
FIG. 5 is a flowchart illustrating some embodiments of a method according to aspects of the present invention.

FIG. 5 is a flowchart illustrating some embodiments of a method according to another aspect for indicating a mismatch configuration of lines 22 of bonding groups 14 in a communications network 10. An End-Service Consumer System node 118 (see FIGS. 8 and 9) is connected to a Service Provider System node via said lines of bonding groups in a communications network. The End-Service Consumer System node 118, 120 is provided with a node entity 42, which enables the node to perform following subparts of the method:

S510: Receiving a Bonding Configuration Value, BCV, via one line of the bonding group of lines connected to the End-Service Consumer System node;

S520: Storing the received BCV, preferably in the Discovery Register (34 in FIG. 3);

S530: Receiving handshaking message G.Hs.;

S540: Sending the stored BCV to the Service Provider System node via each line of the bonding group connected to the End-Service Consumer System node as a response to the received handshaking messages on the lines.

Figure 6:
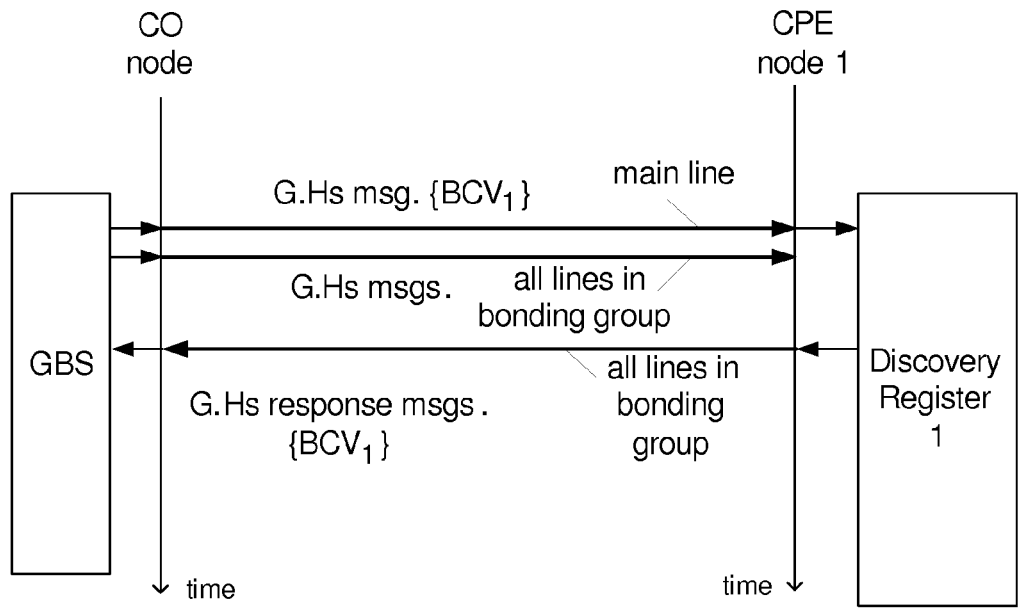
FIG. 6 is a signalling scheme illustrating aspects of the present invention.

FIG. 6 is a signalling scheme illustrating how messages are sent between nodes according to some embodiments in a communications network and wherein there is no CPE node mismatch or cabling mismatch. The xDSL lines belonging to a bonding group are divided into a main line and slave lines, i.e. the remaining xDSL lines of the bonding group. A main line of a bonding group gets the whole bonding configuration command, i.e. SNMP sets from a management system. Further, references are done to the method flowcharts in FIGS. 4A, 4B, and 5 in the following description o the signalling scheme.

The CO node will forward, S440, the selected Bonding Configuration Value, BC Value or BCV, e.g. identification number or string, to the CPE node via the main line through a handshaking message during the handshaking process. The BC value is registered, S520, by means of the controller in the CPE node entity in the Discovery register (34 in FIG. 2). When the CPE sends messages, e.g. handshaking response messages, the controller (36 in FIG. 3) inserts the same BC value in each message, which is separately sent back to the CO node, one message for each xDSL line on the bonding group, S540. As all messages received, S460, at the CO node bring the same BC value, there will be no alarm generated as a result of the test, S480.

Figure 7:
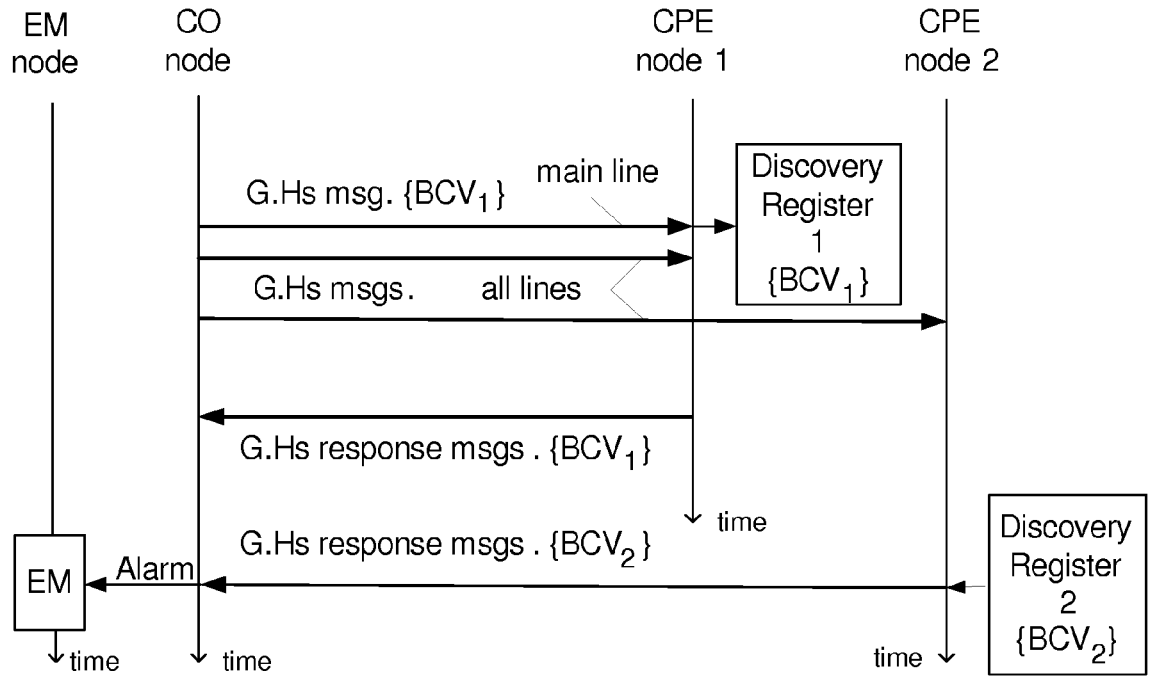
FIG. 7 is a signalling scheme illustrating other aspects of the present invention.

FIG. 7 is a signalling scheme illustrating how messages are sent between nodes according to some embodiments in a communications network and wherein there is CPE node mismatch or cabling mismatch (see 22* in FIG. 2) in the network. The xDSL lines belonging to a bonding group are divided into a main line and slave lines, as described in the description of FIG. 6. As illustrated in FIG. 7, one of the slave lines is connected to CPE node 2 instead of CPE node 1. Further, references are done to the method flowcharts in FIGS. 4A, 4B, and 5 in the following description o the signalling scheme.

The CO node forwards, S440, the selected Bonding Configuration Value $BCV_1$ to the CPE node 1 via the main line through a handshaking message during the handshaking process. The BCV is registered, S520, by means of the controller (36 in FIG. 3) in the node entity in the Discovery register (34 in FIG. 3). When the CPE sends handshaking response messages, the controller will insert the same BC value $BCV_1$ in each message, which is separately sent back to the CO node, S540, one message for each xDSL line on the bonding group. However, the CPE node 2 has another Discovery Register storing another BC value $BCV_2$, which is sent with a response message to the CO node, which node entity (40 in FIG. 3) is configured to check the received BC values, S480. The value that is received by each xDSL line is compared among each other and if any one differs from the other received BC values, a mismatch situation is detected and an alarm message is sent, S495, to the element manager (EM), as illustrated, for informing the element manager.

Figure 8:
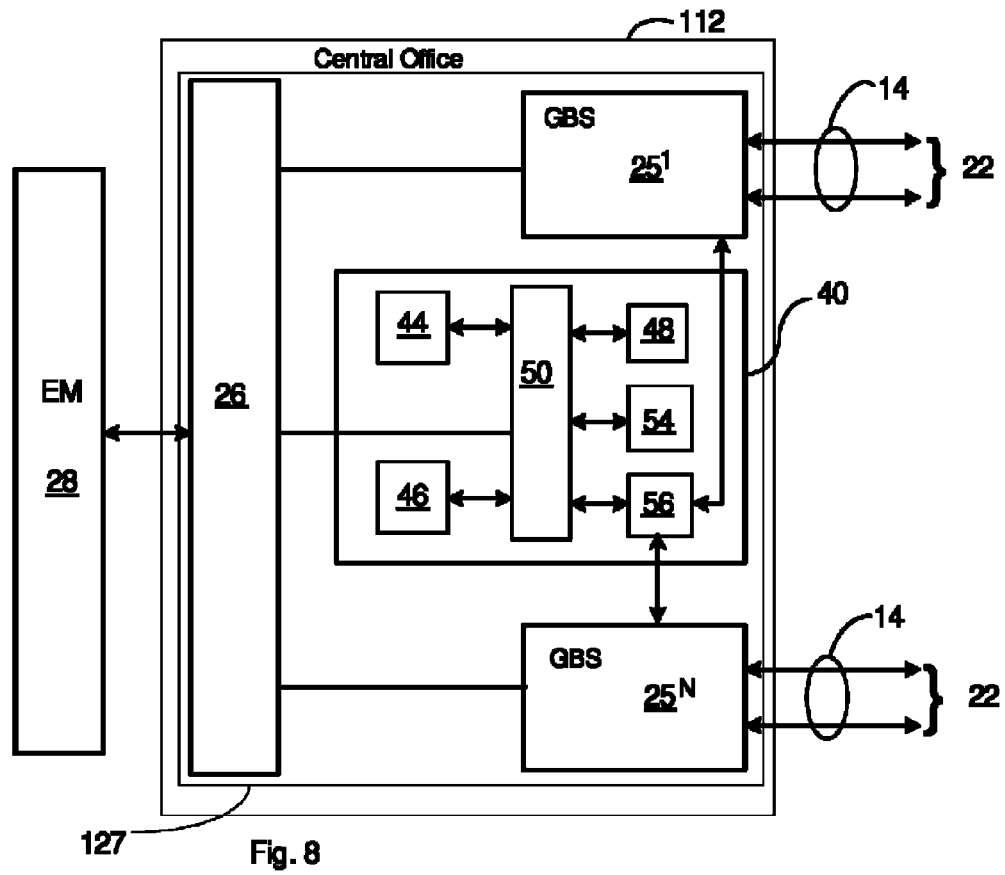
FIG. 8 is a block diagram illustrating a node according to some aspects and embodiments of the present invention.

FIG. 8 is illustrating a node 112 comprising a node entity 40 according to some aspects and embodiments, said node is connected to a communications network (10 see FIG. 3). The node 112 comprises a communication device 127, corresponding to the communications device 27 illustrated and described in FIG. 2, which device 127, e.g. a DSLAM, is provided with a functionality module 40 associated with, or a part of, the Ctrl 26 and connected to each GBS:s $25'''$, in this case $25^1$ and $25^N$. Thus, compared to node 12 in FIG. 2, the node 112 is enabled to detect of CPE mismatch and cabling mismatch and for releasing alarm/event upon detection, and send an alarm message to the Element Manager 28.

The node entity 40 enables the node 112 to detect and indicate a mismatch of bonded lines 22 in bonding group 14 the communications network, wherein the lines of a bonding group connects the node 112 and at least one End-Service Consumer System node, i.e. CPE node 118. The node entity comprises a sender module 44, a receiver 46, and a detector 48. It is further adapted to cooperate with the other entities, i.e. other circuitry, modules, blocks, components, in the node. The node entity 40 comprises a sender module 44 configured to send a Bonding Configuration Value BCV via a selected main line ML of the bonded lines to one of the End-Service Consumer System nodes. Said BC value, e.g. BCV, is unique for a CO Generic Bonded Port (GB port or GBP), and the value is set to be unique for a certain GB port (32 in FIG. 3) and the lines of a bonding group connected to said GB port 25.

The node entity 40 further comprises a reader block 46 configured to extract a BC value in a received message, each such message received and belonging to a bonded line of a bonding group which connects the Service Provider System node with the End-Service Consumer System node. The node further comprises a detector 48 configured to check BC values (as described and illustrated in S480 of FIGS. 4A and 4B) for diverging values, all said checked values having been received via one and the same Generic Bonded Port 32. The detector 48 is configured to compare all received BC values from the different lines, and to detect any BC value that differs from the others. When a deviating BC value is detected, the detector is adapted to generate an alarm, and it may also be configured to indicate the line, or lines, for which the received value is diverging from the sent Bonding Configuration Value, and to send that information to the element manager 28.

A BCV setting module 54 is configured to handle a unique Bonding Configuration Value for each bonding group of lines. It is configured to handle a Management Information Base, MIB, object allowing a user to configure the bonding group value to be set in the CPE discovery register during the handshaking procedure. A new MIB object is provided to an element manager. The MIB object may be configured as the following example:

| adslLineBondPtmGroupUniqueIdentifier OBJECT-TYPE | |
| --- | --- |
| SYNTAX | OCTET STRING (SIZE (6)) |
| MAX-ACCESS | read-write |
| STATUS | obsolete |

Description
 "Configure the unique group identifier. This identifier must be unique all over the network provider."
 DEFVAL {'H000000000000'}
 ::={adslLineBondingConfEntry 21}

A main line selecting module 56 is configured to select one line of the lines in a bonding group as main line for sending a Bonding Configuration Value and Bonding Configuration Command.

The node entity 40 may be implemented by means of software executed by a programmable processor circuit 50, or any other comparable processing circuits or means, which is configured to control the sender module 44, the receiver 46, the detector 48, the BCV setting module 54 and the main line selecting module 56. The node entity 40 and its modules and components may be implemented in digital electronically circuitry, or in computer hardware, firmware, software, or in combinations of them. Apparatus of the invention may be implemented in a computer program product tangibly embodied in a machine readable storage device for execution by a programmable processor; and method steps of the invention may be performed by a programmable processor executing a program of instructions to perform functions of the invention by operating on input data and generating output.

The node entity 40 and its modules may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially—designed ASICs (Application Specific Integrated Circuits).

Figure 9:
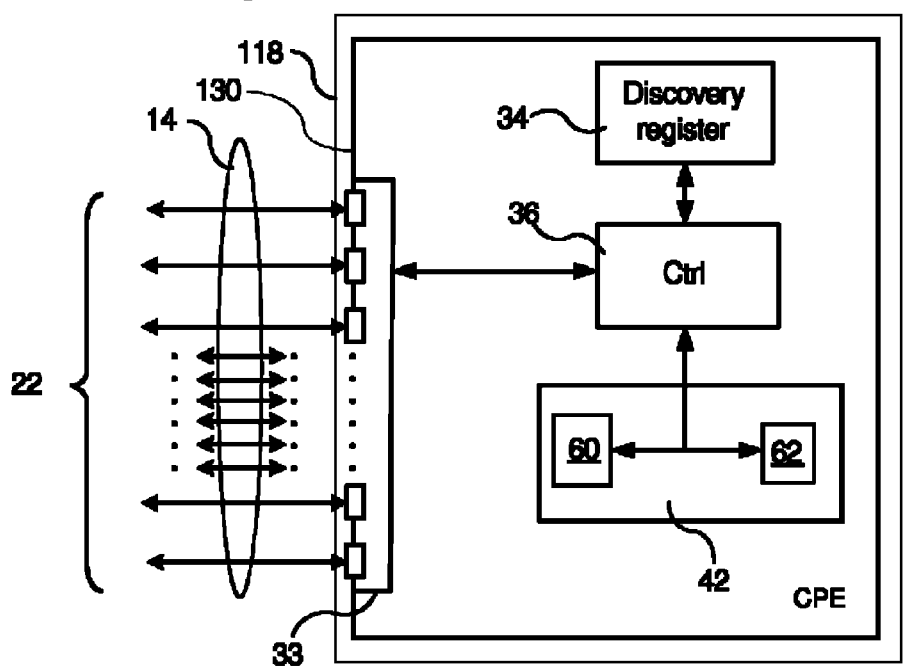
FIG. 9 is a block diagram illustrating another node according to some aspects and embodiments of the present invention.

FIG. 9 is illustrating a node 118 comprising a node entity 42 according to some aspects and embodiments, said node is connected to a communications network (10 in FIG. 3). The node is preferably an End-Service Consumer System node connected to a Service Provider System node. The node 118 comprises a CPE 130 corresponding to the CPE 30 illustrated and described in FIG. 2.

The Ctrl unit 36 of the CPE 130 is provided with node entity 42 for supporting the detection of CPE mismatch and cabling mismatch and for releasing alarm/event upon detection.

The node entity 42 is connected to lines 22 of bonding groups 14 in a communication network. The CPE 130 comprises a GBS port 33 provided with ports (32 in FIG. 3) to which the bonded xDSL lines 22 of the bonding group 14, i.e. the logical communication link 14, are connected.

The entity of the node comprises a receiver 60 configured to receive a Bonding Configuration Value via one line of the bonding group of lines connected to the node 118. The entity is further comprising a sender 62 configured to send the Bonding Configuration Value via each line of the bonding group connected to the node as a response to received handshaking messages on the lines. The received Bonding Configuration Value may be stored in a storage, preferably discovery register 34 if the node is a End-Service Consumer System node. The node entity 42 may be controlled by a programmable processor 36, which is configured to control a receiver 44, and the sender 62. The node entity 42 and its modules and components may be implemented in digital electronically circuitry, or in computer hardware, firmware, software, or in combinations of them. Apparatus of the invention may be implemented in a computer program product tangibly embodied in a machine readable storage device for execution by a programmable processor; and method steps of the invention may be performed by a programmable processor executing a program of instructions to perform functions of the invention by operating on input data and generating output.

Figure 10A:
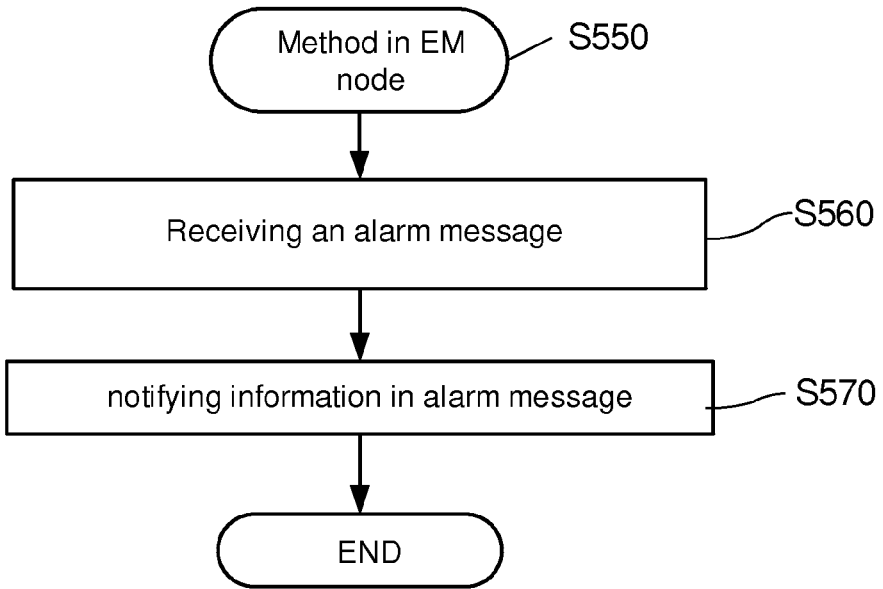
FIG. 10A is a flowchart illustrating some embodiments of a method according to further aspects of the present invention.

FIG. 10A is a flowchart for embodiments of a method S550 performed in a method in a node, preferably a node comprising an Element Manager 28 (see FIG. 1), controlling and managing one or more nodes 12, 112 comprising Central Office functionality in a communications network.

Said embodiments of the method comprise a step, S560, of:
Receiving an alarm message comprising information concerning bonding configuration mismatch in the communications network. Said message is preferably received from a Central Office node, as already described above
Said method may also comprise a step, S570, of:
Notifying the information about the bonding configuration mismatch based on the information in the alarm message. The information is presented to the operator of the network in any optional and suitable format such as an error list message, an error message on a display etc.

When the operator is notified about the bonding configuration problem, e.g. cabling mismatch or CPE mismatch, the operator is able to locate the problem and take the measures to solve or correct the problem. As understood, the information will comprise information that identifies the nodes, components, lines, etc causing the problem.

Figure 10B:
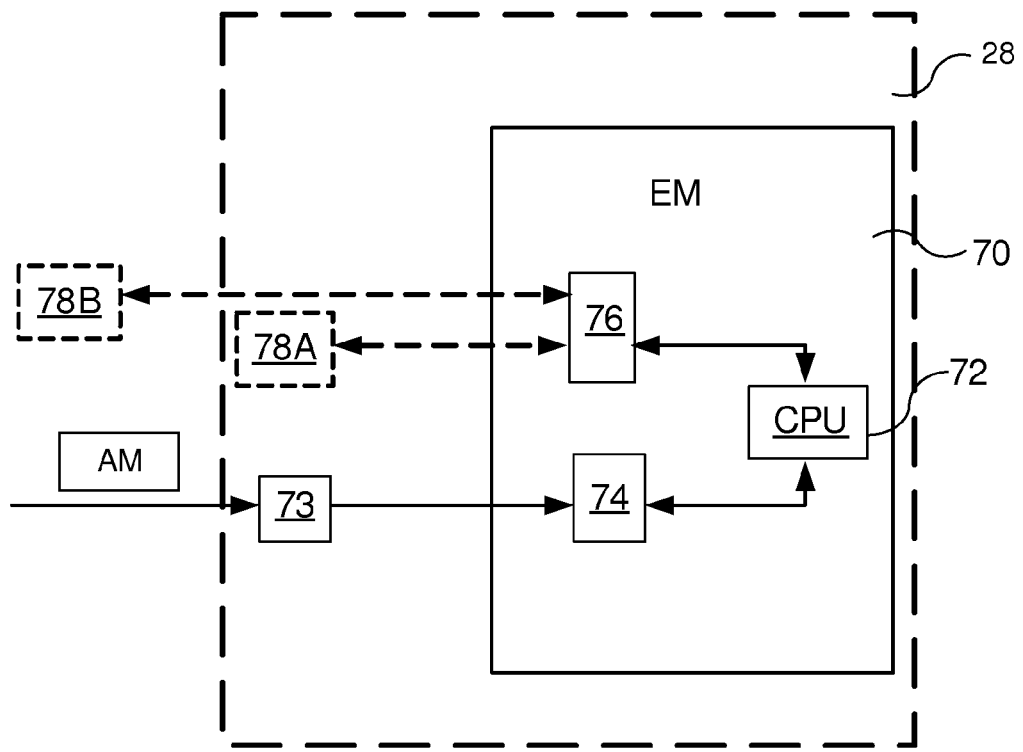
FIG. 10B is a block diagram illustrating a node according to some aspects and embodiments of the present invention.

FIG. 10B is a block diagram illustrating embodiments of a communications network node 28 comprising an Element Manager. The node 28 according to some embodiments comprises an Element Manager 70 connected to a receiver 73. Said receiver forwards the alarm message to the Element Manager which is configured to receive the alarm message AM comprising information about the bonding configuration mismatch in the network. The element manager therefore comprises a receiving block 74 which is adapted to extract the bonding configuration mismatch information from the alarm message AM and process it by means of a Central Processing Unit 72.

The node 28 may also be configured to notify the information about the bonding configuration mismatch based on the information in the alarm message. The Element Manager 70 is therefore provided with a bonding configuration mismatch information block 76. The information is presented to the operator of the network in any optional and suitable format such as an error list message, an error message on a display .etc. For presenting said information the bonding configuration mismatch information block 76 forwards to a presentation device 78A within the node 28 and/or a presentation device 78B located outside the node 28. Said presentation device may be a printer, an image screen, a display, a Liquid Crystal Display etc which presents the information is to an operator in any optional and suitable format such as an error list message, an error message etc.

The invention may advantageously be implemented in one or more computer programs that are executable on a programmable system including at least one programmable processor, processing circuit, Central Processing Unit (CPU), etc coupled to receive data and instructions from, and to transmit data and instructions to, a data storage system, at least one input device, and at least one output device. Each computer program may be implemented in a high-level procedural or object-oriented programming language or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially—designed ASICs (Application Specific Integrated Circuits).

A number of embodiments of the present invention have been described. It will be understood that various modifications may be made without departing from the scope of the invention. Therefore, other implementations are within the scope of the following claims defining the invention.

What is claimed is:

1. A method for indicating a mismatch configuration of lines of bonding groups in a node of a communications network, said method comprising:
    selecting one line of a group of lines known to be in a same bonding group as a main line for sending a Bonding Configuration Value;
    sending the Bonding Configuration Value via the main line, said Bonding Configuration Value being unique for said bonding group;
    sending a G.Hs handshaking message through each line of the bonding group;
    receiving, in response to the G.Hs handshaking message sent through each line of the bonding group, a Bonding Configuration Value via each of the lines known to be in the same bonding group;
    checking each Bonding Configuration Value received from the lines known to be in the same bonding group for diverging values; and
    generating an alarm message if at least one of the received Bonding Configuration Values is diverging,
    wherein the lines of the bonding group are xDSL lines.

2. The method according to claim 1 comprising:
    setting a unique Bonding Configuration Value for each bonding group of lines connected to the node.

3. The method according to claim 1, wherein the generating of an alarm message comprises:
    indicating the line, or lines, for which the received value is diverging from the sent Bonding Configuration Value.

4. The method according to claim 1, wherein the method is performed during or in connection with a handshaking process.

5. A node which comprises a module for indicating a mismatch configuration of bonded lines in a communications network, the node further comprising:
    a main line selecting module adapted to select one line of a group of lines known to be in a same bonding group as a main line for sending a Bonding Configuration Value and a Bonding Configuration Command;
    a sender module configured to send the Bonding Configuration Value via the main line, said Bonding Configuration Value being unique for said bonding group;
    a sender configured to send a G.Hs handshaking message through each line of the bonding group;
    a receiver configured to receive, in response to the G.Hs handshaking message sent through each line of the bonding group, a Bonding Configuration Value via each of the lines known to be in the same bonding group; and
    a detector configured to check each Bonding Configuration Value received from the lines known to be in the same bonding group for diverging values,
    wherein the detector is configured to generate an alarm message if a diverging Bonding Configuration Value is detected from any of the connected lines, and
    wherein the lines of the bonding group are xDSL lines.

6. The node according to claim 5, comprising a Bonding Configuration Value setting module configured to set a unique Bonding Configuration Value for each bonding group of lines connected to the node.

7. The node according to claim 5, wherein the detector is configured to send the alarm message to an element manager, said message comprising information indicating the bonding configuration.

* * * * *

UNITED STATES PATENT AND TRADEMARK OFFICE
CERTIFICATE OF CORRECTION

| | | |
|---|---|---|
| PATENT NO. | : 9,137,112 B2 | Page 1 of 1 |
| APPLICATION NO. | : 12/984724 | |
| DATED | : September 15, 2015 | |
| INVENTOR(S) | : Grillo et al. | |

It is certified that error appears in the above-identified patent and that said Letters Patent is hereby corrected as shown below:

IN THE SPECIFICATION

In Column 7, Line 3, delete "ports 30" and insert -- ports 25 --, therefor.

In Column 8, Line 11, delete "module 40" and insert -- module 44 --, therefor.

In Column 11, Line 65, delete "module 40" and insert -- module 44 --, therefor.

In Column 12, Line 16, delete "BCV," and insert -- $BCV_1$ --, therefor.

Signed and Sealed this
Eighth Day of March, 2016

Michelle K. Lee
*Director of the United States Patent and Trademark Office*